US010027939B2

(12) United States Patent
Kendall et al.

(10) Patent No.: US 10,027,939 B2
(45) Date of Patent: Jul. 17, 2018

(54) USER MESSAGE SYSTEM AND METHOD FOR DIGITAL VIDEO RECORDER

(75) Inventors: Scott Allan Kendall, Lexington, KY (US); Gavin Lee Johnston, Overland Park, KS (US)

(73) Assignee: THOMSON Licensing DTV, Issy-les-Moulineaux (FR)

(*) Notice: Subject to any disclaimer, the term of this patent is extended or adjusted under 35 U.S.C. 154(b) by 754 days.

(21) Appl. No.: 12/227,277

(22) PCT Filed: Jun. 12, 2006

(86) PCT No.: PCT/US2006/022845
§ 371 (c)(1),
(2), (4) Date: Nov. 10, 2008

(87) PCT Pub. No.: WO2007/145621
PCT Pub. Date: Dec. 21, 2007

(65) Prior Publication Data
US 2009/0232473 A1 Sep. 17, 2009

(51) Int. Cl.
H04N 9/82 (2006.01)
H04N 7/173 (2011.01)
(Continued)

(52) U.S. Cl.
CPC ....... *H04N 9/8205* (2013.01); *H04N 7/17318* (2013.01); *H04N 21/4325* (2013.01);
(Continued)

(58) Field of Classification Search
CPC ........... H04N 21/4325; H04N 21/4751; H04N 21/4788; H04N 21/4826; H04N 5/765;
(Continued)

(56) References Cited

U.S. PATENT DOCUMENTS 4,930,158 A    5/1990 Vogel
6,981,223 B2 * 12/2005 Becker et al. ............... 715/753
(Continued)

FOREIGN PATENT DOCUMENTS

CN    1309866 A    8/2001
JP    11015737    1/1999
(Continued)

OTHER PUBLICATIONS

Xingshe et al.: "A Multi-Agent System for Personalized and Private Service in PDR," Proceedings of the International Conference on Information Technology: Computers and Communications (ITCC '03), IEEE, 5 pages.
(Continued)

*Primary Examiner* — Gelek W Topgyal
(74) *Attorney, Agent, or Firm* — Brian J. Dorini; Paul P. Kiel

(57) ABSTRACT

An apparatus and method is presented for receiving and displaying user messages associated with multimedia content. Specifically, the present invention is directed to controlling the operation of a television recording/playback system to permit a user to input a message, associate that message with a selected television program, and display the associated message when the selected television program is accessed by another user (see FIG. 1). The apparatus of the present invention is directed to a system for managing multimedia content including devices for storing television programs and associating with those programs user-generated messages for display to other system users. In this way, the present invention provides content management tools that promote sharing by all users, ease the process of establishing a consensus for managing limited resources, and encourage monitoring by the administrator.

21 Claims, 6 Drawing Sheets

(51) Int. Cl.
   *H04N 21/432*    (2011.01)
   *H04N 21/475*    (2011.01)
   *H04N 21/478*    (2011.01)
   *H04N 21/482*    (2011.01)
   *H04N 5/765*     (2006.01)
   *H04N 5/775*     (2006.01)
   *H04N 5/781*     (2006.01)
   *H04N 21/4788*   (2011.01)

(52) U.S. Cl.
   CPC ..... *H04N 21/4751* (2013.01); *H04N 21/4788* (2013.01); *H04N 21/4826* (2013.01); *H04N 5/765* (2013.01); *H04N 5/775* (2013.01); *H04N 5/781* (2013.01)

(58) Field of Classification Search
   CPC .... H04N 5/775; H04N 5/781; H04N 7/17318; H04N 9/8205
   USPC .................................. 386/239–241, 292–296
   See application file for complete search history.

(56) References Cited

U.S. PATENT DOCUMENTS

| | | | |
   |---|---|---|---|
   | 7,293,276 B2* | 11/2007 | Phillips et al. | 725/42 |
   | 7,519,627 B2* | 4/2009 | Malloy | |
   | 2002/0174430 A1* | 11/2002 | Ellis et al. | 725/46 |
   | 2003/0014750 A1 | 1/2003 | Kamen | |
   | 2003/0154485 A1 | 8/2003 | Johnson et al. | |
   | 2003/0182663 A1* | 9/2003 | Gudorf et al. | 725/110 |
   | 2004/0006698 A1 | 1/2004 | Apfelbaum | |
   | 2004/0044532 A1 | 3/2004 | Karstens | |
   | 2004/0054790 A1 | 3/2004 | Himmel et al. | |
   | 2004/0117837 A1 | 6/2004 | Karaoguz et al. | |
   | 2004/0119894 A1 | 6/2004 | Higgins et al. | |
   | 2004/0223738 A1* | 11/2004 | Johnson | 386/83 |
   | 2004/0244030 A1* | 12/2004 | Boyce | G11B 19/025 725/25 |
   | 2005/0165797 A1 | 7/2005 | Nair | |
   | 2005/0210145 A1* | 9/2005 | Kim et al. | 709/231 |
   | 2006/0044975 A1 | 3/2006 | Miyake et al. | |
   | 2006/0109854 A1* | 5/2006 | Cancel | 370/401 |
   | 2006/0156344 A1* | 7/2006 | Iwata et al. | 725/58 |
   | 2010/0192179 A1* | 7/2010 | Ellis et al. | 725/40 |

FOREIGN PATENT DOCUMENTS

| | | |
   |---|---|---|
   | JP | 2000235546 A | 8/2000 |
   | JP | 2002135710 A2 | 5/2002 |
   | JP | 2002300524 | 10/2002 |
   | JP | 2004039003 | 2/2004 |
   | JP | 2004173252 A2 | 6/2004 |
   | JP | 2004199741 A | 7/2004 |
   | JP | 2004-259375 | 9/2004 |
   | JP | 2004260447 | 9/2004 |
   | JP | 2005108362 | 4/2005 |
   | JP | 2005223846 A2 | 8/2005 |
   | KR | 2003062157 | 7/2003 |
   | WO | 0004707 | 1/2000 |
   | WO | WO0004707 | 1/2000 |
   | WO | WO0028735 | 5/2000 |
   | WO | WO0040026 | 7/2000 |
   | WO | WO03043321 | 5/2003 |
   | WO | WO03043322 | 5/2003 |
   | WO | WO03098926 | 11/2003 |
   | WO | WO2005004483 | 1/2005 |

OTHER PUBLICATIONS

Search Report dated Jan. 24, 2007.

* cited by examiner

USER MESSAGE SYSTEM AND METHOD FOR DIGITAL VIDEO RECORDER

This application claims the benefit, under 35 U.S.C. § 365 of International Application PCT/US2006/022845, filed Dec. 21, 2007 which was published in accordance with PCT Article 21(2) on Apr. 26, 2007 in English.

FIELD OF THE INVENTION

The present invention relates to an apparatus and method for interfacing with a multimedia recording device, and in particular, an apparatus and method for displaying messages associated with programs recorded on a personal video recorder.

BACKGROUND OF THE INVENTION

In recent years, devices for storing video and related content, such as the personal video recorder (PVR) or digital video recorder (DVR), have transformed the multimedia programming landscape. While "time-shifting" television programs has been popular with users since the advent of video tape recorders, new technologies related to broadcasting, communications, digital recording/playback, and data processing have recently come of age, enabling users to obtain multimedia content from a wide variety of sources and make use of this content using a similarly wide variety of consumer devices.

Among those technologies, PVRs, DVRs, and similar devices (e.g. devices sold under the trademarks "TiVo," "RePlayTV," "Sky+," "Showstopper," as well devices running PVR applications such as "EyeTV," "SageTV," "Meedio," "Freevo," etc.) have permitted users to amass large amounts of multimedia content. The abundance of this content (e.g. television programming), is such as to threaten to overwhelm the ability of a typical user to keep track of what is stored. For example, a typical household with two or more users can easily exhaust the storage capacity of a typical DVR, requiring that a content management scheme be implemented in order to determine which content should be deleted or overwritten to make room for new content that users desire to store. In another example, advances in networking technology have enabled, for a single household system, the use of recording and storage devices from any location at any time, leading to confusion as to which household members have accessed particular devices or content.

These problems have traditionally been addressed in DVR systems through the use of automatic content management schemes and user profiles. A typical automatic content management scheme manages content according to a hierarchy established by an administrative user and user characteristics stored in a user profile. For example, the administrator may choose to prevent recording of, or delete on an as-needed basis, those stored programs less favored than other recorded programs, based on content and/or other characteristics, such as length of time since the program was recorded, length of time since the program was last accessed, which user recorded the content, which users have viewed the content, the requesting user's age or household status, etc.

A problem with such an automatic content management scheme is that an administrative user often configures the scheme once during initial setup of the device and subsequently fails to monitor or modify the configuration. This results in user dissatisfaction with the scheme and increasing conflict among household users competing for scarce storage resources (e.g. teenage children). Another problem with such a scheme is that it fails to address a problem inherent in content management activity involving access to a single resource by multiple users: users may require assistance to coordinate their activities, for example via communication, in order to come to an agreement as to which content may be disfavored, forbidden, or otherwise less suitable for storage relative to other content.

For example, some traditional PVR devices include user profiles that permit an administrative user to choose particular television channels, content with particular ratings (e.g. as established by TV Parental Guidelines (TVPG), the Motion Picture Association of America (MPAA), the Entertainment Software Rating Board (ESRB), or other organization), or other features to which each user may or may not be permitted access. In addition to or in conjunction with such user profiles, traditional PVR devices of this type may use "V-Chip" or similar technology to block user access to whole categories of content, some portions of which may be suitable for access by those users. Without more, such blocking may lead to confusion or resistance regarding the content management scheme employed by the PVR. This in turn may lead to user dissatisfaction.

Given that user satisfaction may be negatively affected by the content management schemes previously available, there is a need for a content management system and method that permits users to more easily communicate with other users concerning specific stored content in order to ease the problems that arise from sharing limited storage resources. The desired system and method should provide content management tools that promote sharing by all users, ease the process of establishing a consensus for managing limited resources, encourage monitoring by the administrator, and are compatible with existing systems and devices for a reasonable cost.

SUMMARY OF THE INVENTION

The present invention is directed to an apparatus and method for receiving and displaying user messages associated with multimedia content. Specifically, the method of the present invention is directed to controlling the operation of a television recording/playback system to permit a user to input a message, associate that message with a selected television program, and display the associated message when the selected television program is accessed by another user. The messages may be displayed in a listing of the available recorded programs. The user may input a generic message (e.g. "thumbs up" or "thumbs down") or may input a customized message related to the selected program (e.g. "John watched and disliked") which may be stored for future use with other programs. The message may be displayed when the selected program is accessed for recording, playback, deletion, and/or other operations. The message may be created and/or viewed before or after the program is actually received/recorded and stored. The method of the present invention may store additional characteristics of the message, such as time and date of creation, time and date of association with a selected program, number of times accessed, etc.

In an alternate embodiment, a "targeted" message may be created for use by a specific user or group of users. A first ("originating") user may input a message and designate a second ("target") user for receipt of the message. Proper operation of a targeted message may require authentication of users ("logging in") prior to display of the message. This would allow identification of the target user and display the targeted message to the target user when he/she accesses the selected program. In one embodiment, the method requires that the selected program be associated with the targeted message and with at least a target user, and optionally with an originating user. In addition, user login prior to message input may permit simplified identification of the originating user and display of the targeted message to the originating user as well as the target user upon program access.

The apparatus of the present invention is directed to a system for managing multimedia content for use by a plurality of users. Specifically, the system includes devices for storing audio and/or video programs (e.g. television) and associating with those programs user-generated messages for display to other system users. In various embodiments, the system includes interfaces for use with a variety of broadcasting and content-delivery mechanisms, volatile and non-volatile storage, one or more input/output buses, encoders and decoders for compressed and/or coded content, controllers for audio/video exhibition devices, and processors implementing software and/or firmware instructions. These software and/or firmware instructions include those for creation and display of generic and customized user-generated messages, and association of those messages with selected programs received or recorded from broadcast and/or other content sources.

DETAILED DESCRIPTION

The following discussion of the method and apparatus directed to a method of receiving and displaying messages will help illuminate the features and advantages of the present invention, including its ease of implementation.

In the following discussion, no particular order is required for the method steps described, with the exception of those logically requiring the results of prior steps, for example displaying a user-entered message logically requires the prior input of the user-entered message. Otherwise, enumerated steps are provided below in an exemplary order which may be altered. For instance, steps such as entering a message and selecting a recipient user for the message may be rearranged or performed simultaneously.

Although the following discussion includes the context of television programming, it should be appreciated that the present invention is not so limited and may be applied to a wide variety of multimedia content stored or scheduled to be stored in a multimedia server or other storage system. Likewise, although the system and method of the present invention is discussed with relation to broadcast content (e.g. cable, satellite, and over the air (OTA) television broadcasts), it should be understood that the present invention is not limited to broadcast content, and may be used with content stored on external or internal media or devices, content uploaded, downloaded, or copied from external sources, internally created content, and nearly any other content that may be stored.

Figure 1:
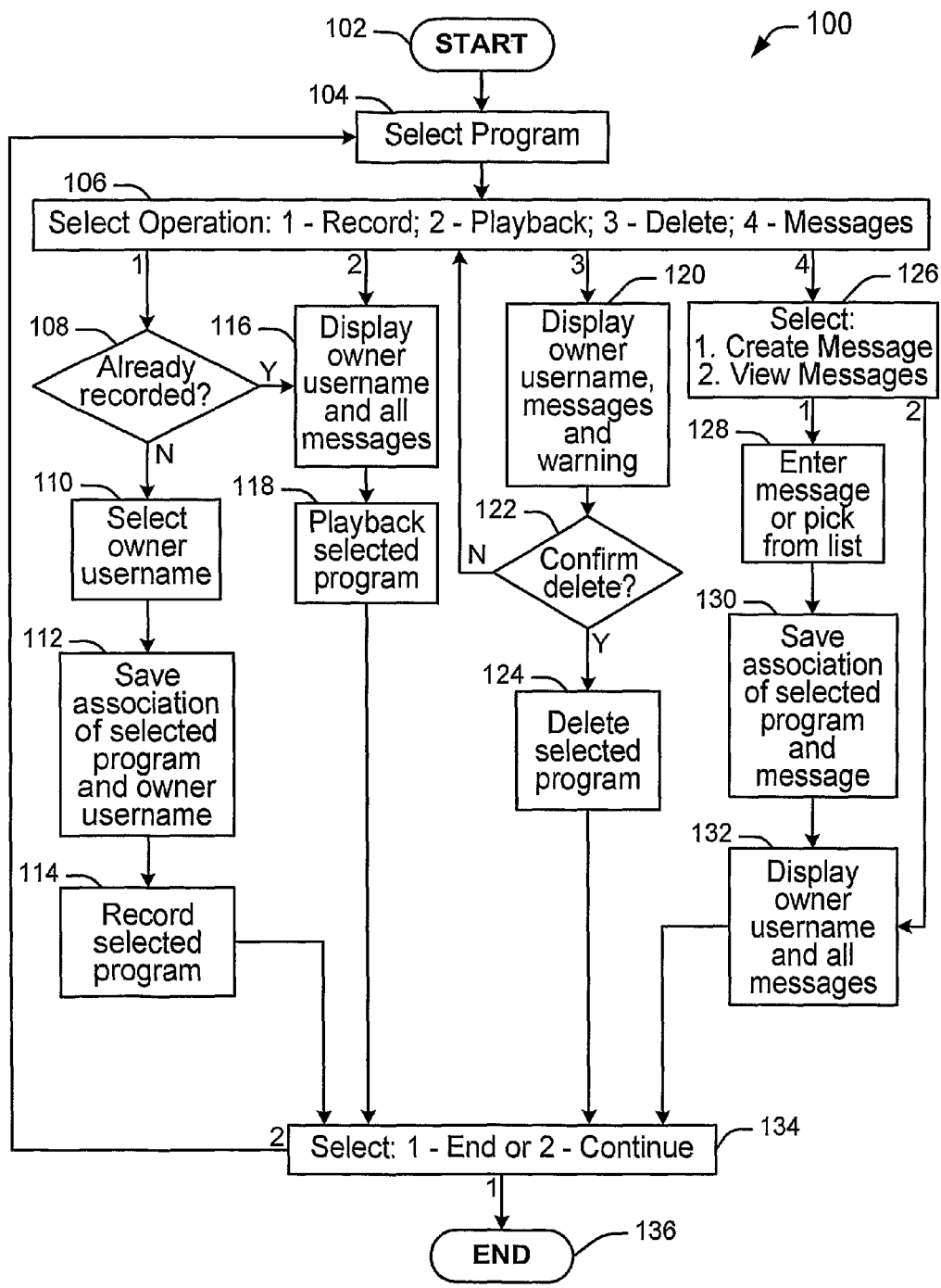
FIG. 1 is a simplified flow diagram illustrating an exemplary method of receiving and displaying messages in accordance with an embodiment of the present invention.

To illustrate the particular features and advantages of the invention, an exemplary method in accordance with an aspect of the invention will now be described with reference to FIG. 1. FIG. 1 shows a flow diagram representation of a method of receiving and displaying messages generally designated 100. The method 100 includes a program selection step 104, an operation selection step 106, recording operation substeps 108, 110, 112, 114, playback operation substeps 116, 118, deletion substeps 120, 122, 124, message creation and review substeps 126, 128, 130, 132, and a continuation step 134.

The method 100 begins at step 102 and proceeds to step 104 in which a user selects a program, such as a digital television program. This step may be accomplished using a typical user interface and display system of any type well known in the art. The user may select the program using a variety of methods including use of an electronic program guide (EPG), entry of a published code or other program identifier, selection of an item from a program list, or by simply selecting starting and ending times for recording a particular television channel. A person of ordinary skill in the art will appreciate that many methods of selecting stored content or programs may be used in keeping with the spirit and scope of the present invention.

In step 106, the user selects one of four operations to be performed in relation to the selected program, including (1) recording, (2) playback, (3) deletion, and (4) message creation/display. If the first operation ("Record") is selected, then the method 100 proceeds to substep 108, in which currently-stored programs and programs previously scheduled for recording are compared to the selected program to determine whether or not the selected program has already been recorded or selected for recording. If so, the method 100 proceeds to substep 116 (described below). If not, the method 100 proceeds to substep 110, in which the user selects a username to associate with the selected program to be recorded. The username may be selected from a list of available usernames or the user may choose to create a new username. The username so selected is designated the "owner" username, to signify that a user corresponding to this username was responsible for originally determining that the selected program was worthy of recording and may imply that the user corresponding to the owner username should be consulted prior to any future deletion operation on the selected program.

It should be appreciated by a person of ordinary skill in the art that, in the absence of prior user authentication, the selection of an "owner" username to be associated with the selected program to be recorded is not confined to any particular username(s). In fact, any user may choose any username to associate with the selected program to be recorded, including usernames that may or may not correspond to the user involved in selecting the selected program for recording. In this way, users may recommend selected programs to other users, or act as a proxy on behalf of a user unwilling or unable to be involved in selecting a program to be recorded. In some households, there may be users of television program content who prefer not to interact with recording systems and methods, but who nevertheless are responsible for determining that a selected program is worthy of recording or wish to be consulted prior to any deletion operations of a selected program. This functionality permits the method 100 of the present invention to have increased flexibility and utility, encouraging communication and sharing among users.

According to the illustrated embodiment, the method 100 then proceeds to substep 112, in which the association of the selected program and the selected username is saved or stored in accordance with the present invention. It should be appreciated that a wide variety of physical and logical schemes for storing such association may be used without deviating from the spirit and scope of the present invention. Thus, the subject association may be recorded, for example on a hard disk. In one embodiment, a direct logical association is made between user and content. Alternatively, the association between user and content they be stored employing a pre-existing logical association scheme such as the arrangement used for relating the content of the selected program to, for example, running time, TVPG/ESRB/MPAA rating, etc.

The method 100 then proceeds to substep 114, in which the selected program is recorded and stored, or scheduled for recording or storage at some future time. For example, if the selected program is a satellite broadcast to occur next Monday from 10:00 pm to 11:00 pm, the method 100 schedules the selected program for recording at the appointed time and proceeds to continuation step 134.

At continuation step 134, the user selects whether to return to the program selection step 104, or exit the method 100. If the user chooses to exit, the method 100 ends at step 136. Thereafter, at some future time, the same or another user may choose to begin the method 100 again.

If at operation selection step 106 the second operation ("Playback") is selected, then the method 100 proceeds to substep 116, in which the owner username associated with the selected program is displayed along with all messages created in the message creation substeps 126, 128, 130 (described in more detail below). Of course, if the selected program is one that has not yet been selected for recording or is otherwise not eligible for playback, then the substep 116 is nonfunctional or preferably the "Playback" operation is not available to the user, i.e. the method 100 reverts to operation selection step 106. Otherwise, the method 100 proceeds to substep 118 in which the selected program is played back or displayed using appropriate audio and video devices. If the selected program is not available, for example it may be scheduled for recording but has not yet been recorded, playback substep 118 does not include playback or display of the program content and instead the method 100 proceeds to continuation step 134, preferably with an accompanying message communicating to the user that the selected program is not available for playback. If the selected program is available, following playback or display of the selected program content the method 100 proceeds to continuation step 134.

If at operation selection step 106 the third operation ("Delete") is selected, then the method 100 proceeds to substep 120, in which the owner username associated with the selected program is displayed along with all messages created in the message creation substeps 126, 128, 130 (described below), as well as a warning to the user (e.g., 'the selected operation will permanently remove the selected program and future users will be unable to view the program'). Of course, if the selected program is one that has not yet been recorded, stored, or selected for recording or is otherwise not eligible for deletion, then the substep 120 is nonfunctional or preferably the "Delete" operation is not available to the user, i.e. the method 100 reverts to operation selection step 106. Otherwise, the method 100 proceeds to substep 122 in which the user is given the opportunity to cancel or confirm the deletion operation, for example the user may cancel if he/she prefers not to proceed with deleting the selected program in light of the information conveyed in the messages or warning displayed in substep 120. If the user chooses "N" to cancel the deletion operation, the method 100 reverts to operation selection step 106. If the user chooses "Y" to confirm the deletion operation, the method 100 proceeds to substep 124 in which the selected program is deleted from storage. Following the deletion operation, the method 100 proceeds to continuation step 134.

If at operation selection step 106 the fourth operation ("Messages") is selected, then the method 100 proceeds to substep 126, in which the user may select one of two operations related to user messages associated with the selected program, including (1) create messages, and (2) view messages. If the user selects the first message operation ("Create"), the method 100 proceeds to substep 128 in which the user is prompted to input a message to be viewed by future users who choose to access (e.g. playback, delete, attempt to record after prior scheduling/recording, etc.) the selected program.

Figure 2:
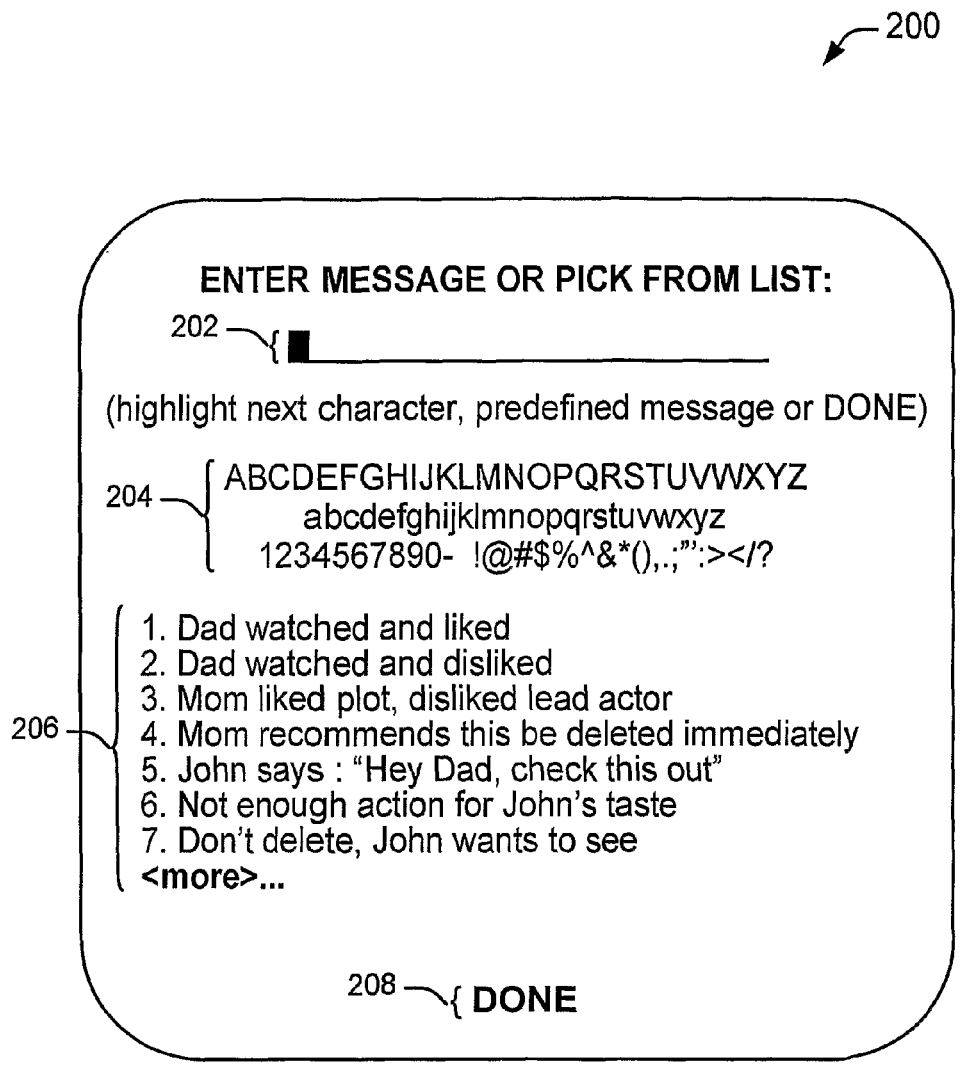
FIG. 2 is a simplified pictorial diagram illustrating an exemplary user interface that may be used to input messages in accordance with an embodiment of the present invention.

An exemplary user interface that may be used to accomplish substep 128 will now be described with reference to FIG. 2. FIG. 2 shows a simplified pictorial diagram illustrating an exemplary user interface that may be used to input messages, for example an interactive display generally designated 200. Interface 200 includes a message entry area 202, character selection choices 204, predefined message selection choices 206, and a completion indicator 208. To complete substep 128, the user may compose a custom message by sequentially selecting individual characters from among the character selection choices 204, or may compose a custom message by first selecting one of the predefined messages from among the predefined message selection choices 206 and then modifying it. Alternatively, the user may choose one or more of the predefined message selection choices 206 without modification. Following composition of a desired message to be associated with the selected program, the user may signal that the message is complete by selecting the completion indicator 208. The message may then be stored for use with future program selections and/or users. Alternatively, the association of a particular program with a specific user may be indicated on the listing of programs prior to the selection of programs by the user at step 104.

It should be understood that more than the limited number of characters and/or predefined messages illustrated in FIG. 2 may be stored for use in selecting messages in accordance with the present invention. For example, the selection "<more . . . >" as shown may be used to continue the display of messages and/or characters on succeeding display areas of the interface as is well known in the art. Of course, a person of ordinary skill in the art would recognize that many alternative approaches may be used to facilitate user interaction with the user interface described in FIG. 2, including use of a conventional television remote control device, keyboard, mouse, gamepad, etc.

Referring again to FIG. 1, the method 100 proceeds from substep 128 to substep 130, in which the association of the selected program and the selected message is saved or stored in accordance with the present invention. This association may be stored, for example in hard disk storage, in a manner directly or indirectly associated with the content of the selected program. Alternatively, the association may be stored in a manner similar to other characteristics and information related to the content of the selected program, for example running time, TVPG/ESRB/MPAA rating, etc. It should be appreciated that many different options for storing such association may be used without deviating from the spirit and scope of the present invention.

The method 100 then proceeds to substep 132, in which the user may review the resulting messages in context with other messages associated with the selected program including the owner username. If at substep 126 the user selects the second message operation ("View"), the method 100 proceeds from substep 126 to substep 132, permitting the user to review all messages associated with the selected program and the owner username. This information is available, for example, to assist the user in determining whether an additional message is necessary or appropriate in light of messages previously associated with the selected program. The method 100 then proceeds to continuation step 134.

Prior to the operations described with reference to FIGS. 1 and 2, it would be preferable to have at least one username configured for use as an owner username, for example using the method 300 described below with reference to FIG. 3. It should be appreciated that such configuration is not strictly required in accordance with the previously-described embodiment of the present invention, but alternate embodiments may require such user configuration for proper operation. Users of the present invention may find that user configuration enhances communication and increases effectiveness, especially where identification of users may assist communication and resolve disputes among users in a context directly associated with the subject programming content. Other methods of user configuration may be used without departing from the spirit or scope of the present invention.

Figure 3:
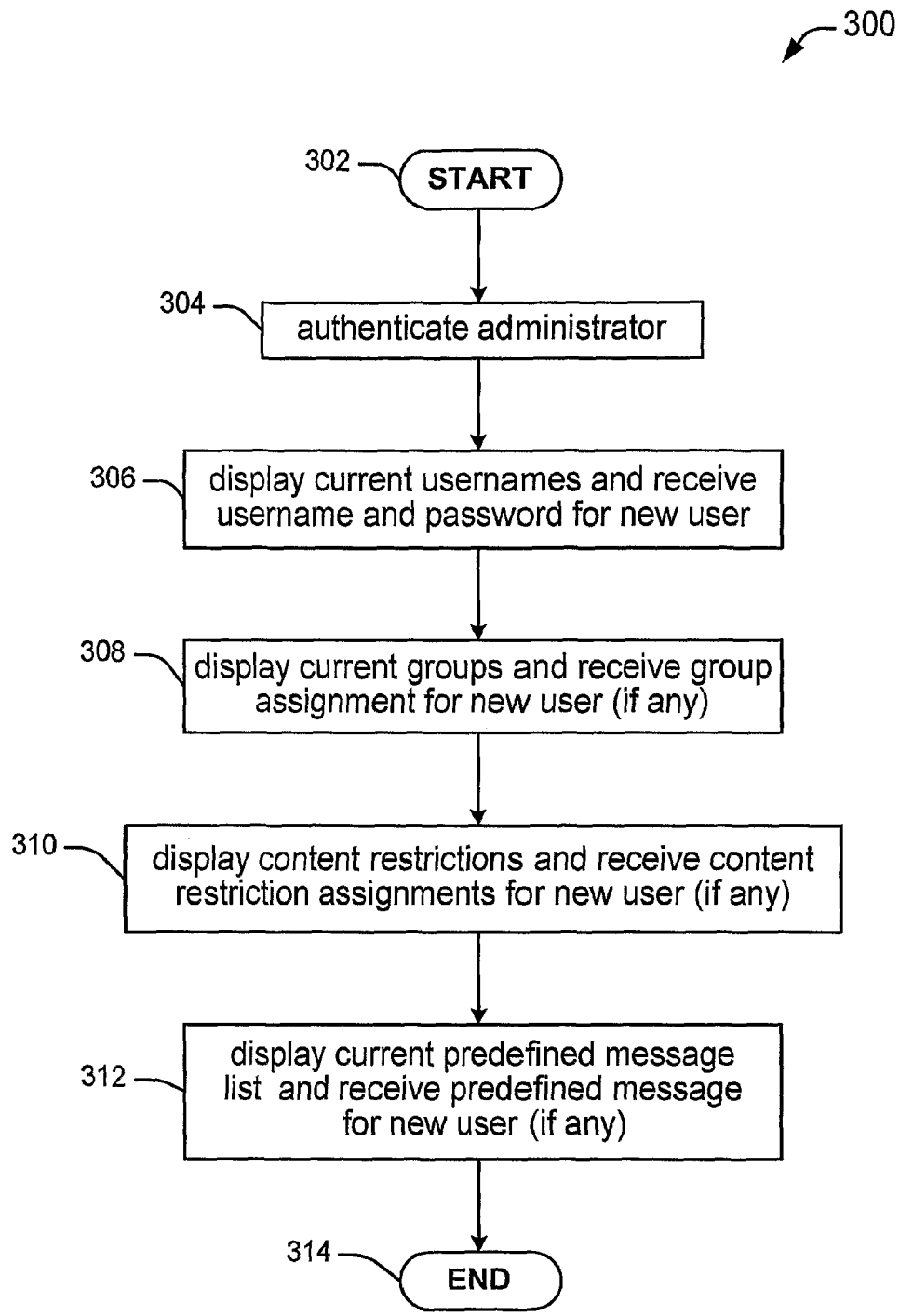
FIG. 3 is a simplified flow diagram illustrating an exemplary method of user configuration that may be used in conjunction with an embodiment of the present invention.

Referring to FIG. 3, a method of user configuration for use with the present invention is generally designated 300. The user configuration method 300 includes administrator authentication step 304, username display and input step 306, group display and input step 308, restriction display and input step 310, and predefined message display and input step 312.

The illustrated user configuration method 300 begins at step 302 and proceeds to administrator authentication step 304, in which an administrator logs in and otherwise verifies his or her identity or authorization to act as the administrative user, for example by entering a username and password as is well known in the art. If no user has ever previously logged in, the method 300 may create a new username and may inquire whether the new username should be designated as an administrator or optionally may automatically designate the username as an administrator. Alternate approaches to authentication may be used, for the administrator and/or all users, such as biometric identification, hardware or software keys, etc.

In the illustrated embodiment, the user configuration method 300 then proceeds to username display and input step 306, in which all previously-defined usernames are displayed. Several options may be available to the administrator at step 306, including options permitting the creation of a new username, modifying an existing username, modifying traits or other information associated with an existing username, etc. The administrator may choose from among these options and may input a new username and optionally may associate with that username a password. Any number of usernames may be configured, corresponding to one or more users, program categories, or other entities according to whatever organizational approach may be preferred by the administrator. For example, the administrator may create a username "John" corresponding to a child residing within the household.

The illustrated method 300 then proceeds to group display and input step 308, in which all previously defined groups are displayed. A "group" is a selection of one or more usernames that may be related in some way or may be treated in a similar fashion for certain operations. For example, the administrator may prefer to place all usernames corresponding to children in the household in a group labeled "Kids" in order to ease communication of messages to the entire group. Several options may be available to the administrator at step 308, including options permitting the creation of a new group, modifying an existing group, modifying traits or other information associated with an existing group, etc. The administrator may choose from among these options and may input a new group label. The administrator may optionally assign usernames to one or more groups.

The illustrated user configuration method 300 then proceeds to step 310, in which restrictions assigned to one or more usernames or groups are displayed. A "restriction" is a selection of one or more limits that may be applied to reduce or prevent access of a user or group of users to programs or other content. For example, a content restriction may be applied to the group labeled "Kids" in order to prevent children from accessing movies receiving an "R" rating from the MPAA, television programs receiving a "TV-MA" rating from the TVPG, and any other programs selected by the administrator, or other designated users, as unavailable to the group. In accordance with one embodiment of the present invention, no restrictions are required, but the administrator may choose to assign one or more restrictions to one or more usernames or groups.

The method 300 then proceeds to step 312, in which predefined messages are displayed and the administrator is provided options for creating new generic messages or modifying existing messages. A "predefined message" is a message that has been previously stored and/or associated with a program by a user. To encourage communication and sharing, the administrator may prefer to create predefined messages for a new username, for example for a new username "John" a new predefined message may be created, "John watched, disliked; please delete." This type of message may, for example, help communicate to other users that the associated program may be deleted without further consulting John.

The method 300 then ends at step 314 until an administrator begins the method 300 again.

Figure 4:
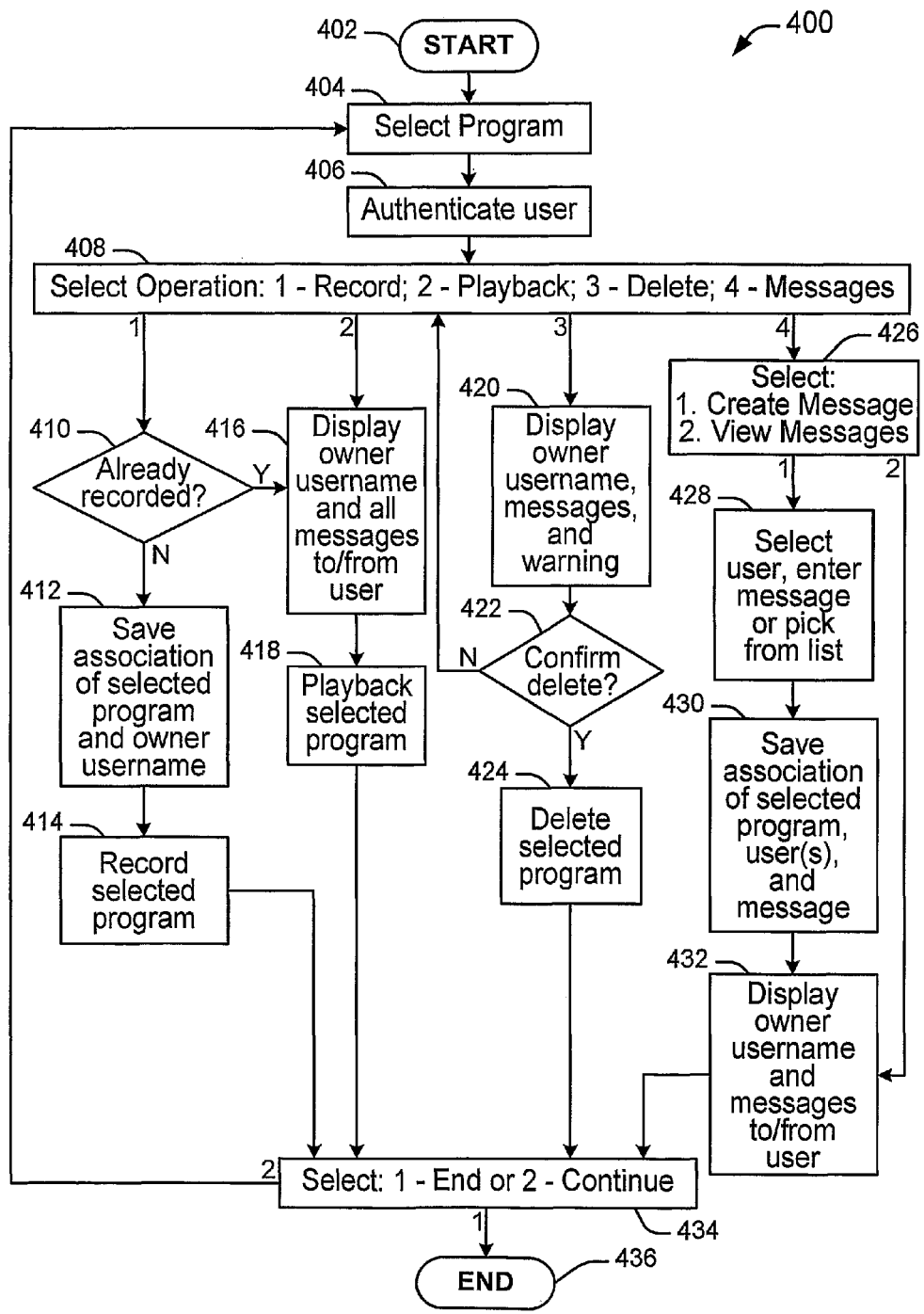
FIG. 4 is a simplified flow diagram illustrating an exemplary method of receiving and displaying messages in accordance with an alternate embodiment of the present invention.

An exemplary method in accordance with an alternate embodiment of the invention will now be described with reference to FIG. 4. FIG. 4 shows a flow diagram representation of a method of receiving and displaying messages generally designated 400. The method 400 includes a program selection step 404, a user authentication step 406, an operation selection step 408, recording operation substeps 410, 412, 414, playback operation substeps 416, 418, deletion substeps 420, 422, 424, message creation and review substeps 426, 428, 430, 432, and a continuation step 434.

The method 400 begins at step 402 and proceeds to step 404 in which a user selects a program, such as a digital television program. The program selection step 404 may be completed using one or more of the approaches and devices described previously with reference to FIG. 1 and the accompanying text describing program selection step 104. The method 400 then proceeds to user authentication step 406, in which a user may "log in" or provide verification that the user has authority to access the selected program and associated information, for example by entering a username and password as is well known in the art. Alternate approaches to authentication may be used, such as biometric identification, hardware or software keys, etc. If no user has ever previously logged in, the method 400 may offer options to create a new username and/or complete a user configuration method such as user configuration method 300 described above with reference to FIG. 3. Alternatively, the user may be required to log in prior to the selection of a program, for example, prior to displaying a listing of the available recorded programs.

Following user authentication step 406, the method 400 proceeds to operation selection step 408, in which the user selects one of four operations to be performed in relation to the selected program, including (1) recording, (2) playback, (3) deletion, and (4) message creation/display. If the first operation ("Record") is selected; then the method 400 proceeds to substep 410, which has been described above with reference to FIG. 1 and the accompanying text describing substep 108. If the selected program has already been recorded or scheduled for recording, the method 400 proceeds to substep 416 (described below). If not, the method 400 proceeds to substep 412, in which the association of the selected program and the username (authenticated at user authentication step 406) is saved or stored in a manner similar to substep 112 described above with reference to FIG. 1.

The username authenticated at user authentication step 406 is designated the "owner" username to signify that a user corresponding to this username was responsible for originally determining that the selected program was worthy of recording and may imply that the user corresponding to the owner username should be consulted prior to any future deletion operation on the selected program. The method 400 then proceeds to substep 414, in which the selected program is recorded or scheduled for recording at some future time, as described above with reference to FIG. 1 and the accompanying text describing substep 114. The method 400 then proceeds to continuation step 434.

At continuation step 434, the user selects whether to return to the program selection step 404, or exit the method 400. If the user chooses to exit, the method 400 ends at step 436 until the same or another user chooses to begin the method 400 again. A current user may log out at anytime, in which case a new user would be required to log in before making a program selection. Alternatively, a default username may be provided that is accessible to all users.

If at operation selection step 408 the second operation ("Playback") is selected, then the method 400 proceeds to substeps 416 and 418, in which the owner username associated with the selected program, messages, and selected program content are displayed in the manner described above with reference to FIG. 1 and the accompanying text describing substeps 116, 118. The method 400 then proceeds to continuation step 434.

If at operation selection step 408 the third operation ("Delete") is selected, then the method 400 proceeds to substeps 420, 422, 424, in which the method 400 operates in the manner described above with reference to FIG. 1 and the accompanying text describing substeps 120, 122, 124. The method 400 then proceeds to continuation step 434.

If at operation selection step 408 the fourth operation ("Messages") is selected, then the method 400 proceeds to substep 426, in which the user may select one of two operations related to user messages associated with the selected program, including (1) create messages, and (2) view messages. If the user selects the first message operation ("Create"), the method 400 proceeds to substep 428 in which the user is prompted to input a message to be viewed by future users who choose to access (e.g. playback, delete, attempt to record after prior scheduling/recording, etc.) the selected program.

Figure 5:
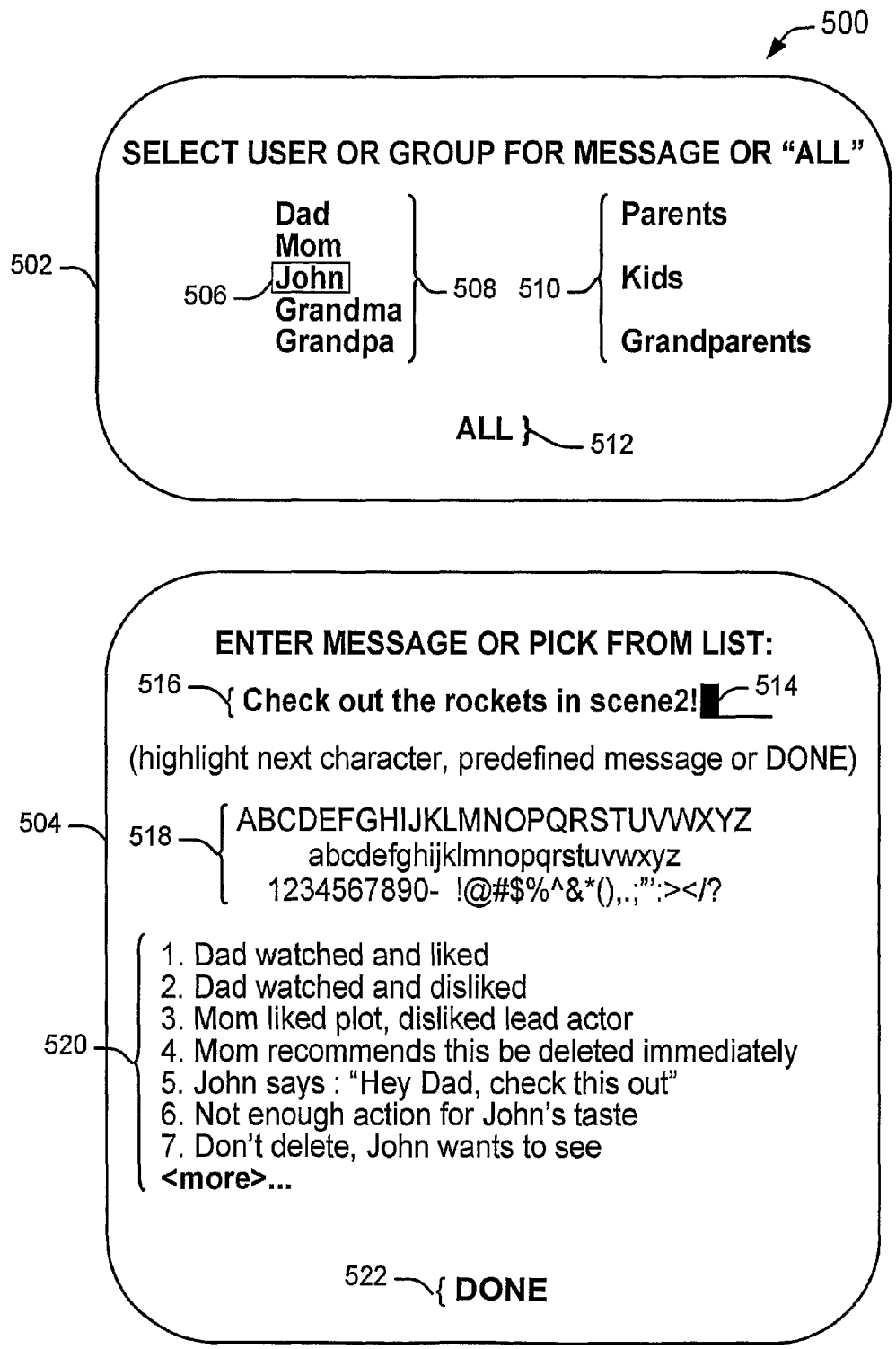
FIG. 5 is a simplified pictorial diagram illustrating an exemplary user interface that may be used to input messages in accordance with an alternate embodiment of the present invention.

An exemplary user interface that may be used to accomplish substep 428 will now be described with reference to FIG. 5. FIG. 5 shows a simplified pictorial diagram illustrating an exemplary user interface that may be used to input messages, for example a series of messages exhibited on an interactive display generally designated 500. Interface 500 includes recipient designation screen 502 and message entry screen 504. Recipient designation screen 502 includes designator 506, username list 508, group list 510, and public message signifier 512. Message entry screen 504 includes a message entry area 516, character position indicator 514, character selection choices 518, predefined message selection choices 520, and a completion indicator 522.

To complete substep 428, the user may first select one or more usernames or groups to receive the (yet to be entered) message at the recipient designation screen 502. The selected one or more recipients may be chosen (using the designator 506) from among the usernames listed in username list 508 and/or from among the groups listed in group list 510. In that event, the (yet to be entered) message would be designated a "targeted" message that is displayed only when an authenticated user corresponds to a username or group chosen at recipient designation screen 502. Alternatively, if the user would like the (yet to be entered) message to be visible to all users, the public message signifier 512 may be selected.

The user may then compose a custom message at message entry screen 504 by sequentially selecting individual characters from among the character selection choices 518, or may compose a custom message by first selecting one of the predefined messages from among the predefined message selection choices 520 and then modifying it. Alternatively, the user may choose-one or more of the predefined message selection choices 520 without modification. As the message is composed, characters are displayed in message entry area 516 and the position of the next character to be added is displayed at character position indicator 514. Following composition of a desired message to be associated with the selected program, the user may signal that the message is complete by selecting the completion indicator 522. The message may then be stored for use with future program selections and/or users.

It should be understood that more than the limited number of usernames, groups, characters and/or predefined messages illustrated in FIG. 5 may be available for use in selecting recipients and messages in accordance with the present invention. For example, the selection "<more . . . >," as shown among predefined message selection choices 520, may be used to continue the display of usernames, groups, messages and/or characters on succeeding display areas of the interface 500 as is well known in the art. Of course, a person of ordinary skill in the art would recognize that many alternative approaches may be used to facilitate user interaction with the user interface 500 described in FIG. 5, including use of a conventional television remote control device, keyboard, mouse, gamepad, etc.

Referring again to FIG. 4, the method 400 proceeds from substep 428 to substep 430, in which the association of the selected program, the recipient user(s), and the selected message is saved or stored in accordance with the present invention. Alternate embodiments of the present invention may also associate the selected program with information identifying the user sending or composing the message. For example, the username authenticated in user authentication step 406 may be stored and associated with the selected program, the recipient user(s), and the message created in substep 428. This association may be stored, for example in hard disk storage, in a manner directly or indirectly associated with the content of the selected program. Alternatively, the association may be stored in a manner similar to other characteristics and information related to, but not comprising, the content of the selected program, for example running time, TVPG/ESRB/MPAA rating, etc. It should be appreciated that many different options for storing such association may be used without deviating from the spirit and scope of the present invention.

The method 400 then proceeds to substep 432, in which the user may review the resulting message composed in substep 428 in context with other messages associated with the selected program including the owner username. If at substep 426 the user selects the second message operation ("View"), the method 400 proceeds from substep 426 to substep 432, permitting the user to review all messages associated with the selected program and the owner username, for example to assist the user in determining whether an additional message would be necessary or appropriate in light of messages previously associated with the selected program. The method 400 then proceeds to continuation step 434.

Figure 6:
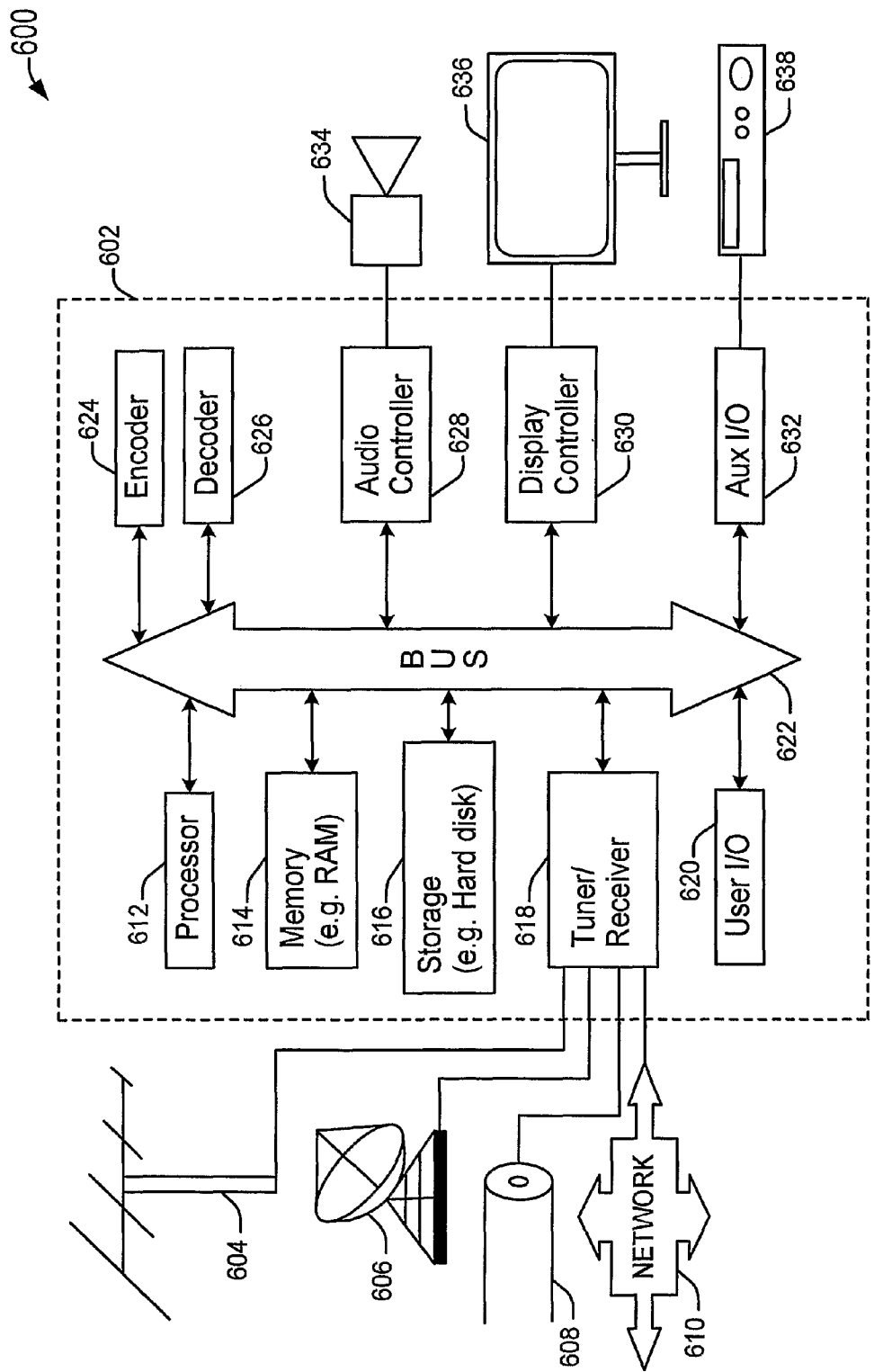
FIG. 6 is a simplified pictorial block diagram illustrating an exemplary system implementing a message input and display scheme in accordance with another alternate embodiment of the present invention.

A digital television reception system permitting customized message input and display in accordance with an aspect of the present invention is illustrated in FIG. 6. The digital television reception system 600 includes television signal sources 604, 606, 608, 610, a processing unit 602, an audio display device (transducer) 634, a video display device 636, and an external recording device 638. The television signal sources may include, for example, a conventional antenna 604 configured to receive terrestrial or over-the-air (OTA) television signals, a satellite transceiver 606 configured to receive television signals transmitted or reflected from airborne or spaceborne devices, a transmission cable 608 configured to transfer cable television signals, and a network connection 610 configured to receive and transfer information over a public or private network, for example data transmitted using multiple different protocols over the Internet. Of course, it should be apparent to one of ordinary skill in the art that all of the described television signal sources 604, 606, 608, 610 described are not required, the present invention is not so limited and may be used with one or a plurality of reception devices configured for placement at ground level or otherwise and configured to receive analog or digital terrestrial television signals, satellite television signals, cable television signals, or other television signals desired to be received. The television signal sources 604, 606, 608, 610 may include amplifiers, pre-amplifiers, or other components for television reception as is well known in the art. The television signal sources 604, 606, 608, 610 may be coupled to the processing unit 602 via coaxial cable, fiber optic cable, ribbon cable, high speed data transmission line, or other signal transmission conduit known in the art.

The processing unit 602 includes a processor 612, random access memory (RAM) 614, hard disk storage 616, a tuner/receiver 618, at least one user input/output device 620, a bus 622 including, for example, a data bus, an encoder 624 and decoder 626, an audio controller 628 coupled to the audio display device (transducer) 634, a video display controller 630 coupled to the video display device 636, and at least one auxiliary input/output device 632. The auxiliary input/output device 632 may be coupled to an external recording device 638 as shown in FIG. 6, or may alternatively be coupled to other recording, mass storage, playback, display, exhibition, or networking devices as are well known in the art.

The processing unit 602 includes software and/or firmware instructions that implement a message input and display scheme in accordance with the present invention. For example, the processing unit 602 may be configured to implement the method 100 described above with reference to FIGS. 1 and 2. Alternatively, the processing unit 602 may be configured to implement the methods 300 and 400 described above with reference to FIGS. 3-5. In operation, a user may utilize processing unit 602 in conjunction with television signal sources 604, 606, 608, 610 and display and recording devices 634, 636, 638 to record, playback, delete, "time-shift," or otherwise access digital television programs as well as a variety of other multimedia content. In accordance with the present invention, users may associate owner usernames, messages, recipients for those messages, and/or other communications with each of the programs and/or other content stored or accessible via processing unit 602 and digital television system 600.

As illustrated in the preceding discussion and accompanying figures, the method and apparatus of the present invention represent an improvement in the state of the art for digital television systems and associated methods. The present invention provides a method for controlling the operation of a television recording/playback system to permit a user to input a message, associate that message with a selected television program, and display the associated message when the selected television program is accessed by another user. These advantages can be embodied in a digital television reception system capable of receiving a wide variety of digital content, may be produced for a reasonable cost, and may be configured for use with conventional digital television delivery systems, e.g. cable, satellite, terrestrial, internet, etc.

While the invention has been described in detail in connection with the preferred embodiments known at the present time, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

The invention claimed is:
1. A method of controlling a video apparatus, comprising:
providing user interface that enables a user to create a plurality of usernames associated with the video apparatus, and to associate each of the plurality of usernames with selected ones of a plurality of users associated with the video apparatus;

recording a selected program responsive to a request from a first user;

receiving a selection input from the first user to select one of the plurality of usernames associated with the video apparatus, including a username associated with a second user different from the first user, to be designated as an owner username of the recorded program, whereby the owner username is indicated to be responsible for requesting the recording of the selected program;

receiving a request to access the recorded program;

receiving a user-entered message from the first user;

associating said user-entered message with the selected program; and generating an output signal suitable for coupling to a display device and display the user entered message and the owner username indicated to be responsible for requesting the recording in response to the recorded program being accessed by a third user.

2. The method as in claim 1, wherein the receiving a user-entered message includes receiving a targeted message and a designation of the third user; and the display of the user-entered message includes display of the targeted message only when the selected program is accessed by the third user.

3. The method as in claim 1, wherein the access of the selected program by the third user includes requesting playback of the selected program.

4. The method as in claim 1, wherein the access of the selected program by the third user includes requesting deletion of the selected program.

5. The method as in claim 1, wherein the access of the selected program by the third user includes requesting a listing of recorded programs including the selected program.

6. The method as in claim 5, wherein the access of the selected program by the third user includes requesting display of messages associated with the listing of recorded programs.

7. The method as in claim 1, wherein the access of the selected program by the third user includes requesting recordation of the selected program subsequent to the first user requesting recordation of the selected program.

8. The method as in claim 1, further comprising authenticating the first user of a plurality of users.

9. The method as in claim 8, further comprising receiving a user-entered message from the first user; associating the user-entered message with the selected program; and displaying the user-entered message when the selected program is accessed by the third user.

10. The method as in claim 1, further comprising receiving a second message from the third user when the selected program has been accessed by the third user;

associating the second message with the selected program; and displaying the second message indicating association of the selected program with the second message when the selected program is accessed by the first user.

11. The method as in claim 10, wherein the access of the selected program by the first user includes requesting playback of the selected program.

12. The method as in claim 10, wherein the access of the selected program by the first user includes requesting deletion of the selected program.

13. The method as in claim 10, wherein the access of the selected program by the first user includes requesting a listing of recorded programs including the selected program.

14. The method as in claim 13, wherein the access of the selected program by the first user includes requesting display of messages associated with the listing of recorded programs.

15. An apparatus, comprising: a video signal source;

a processing unit coupled to receive signals representative of a video program from the video signal source and process the received signals to provide an output signal for display;

an On Screen Display unit for generating on screen displays;

a control unit; and a user input/output device, coupled to the control unit, configured to receive input from an administrator and cause the apparatus to create a plurality of usernames associated with the video apparatus in response to the input, and associate each of the plurality of usernames with selected ones of a plurality of users associated with the video apparatus, the input/output device also configured to receive record input from a first user to record a selected program and a selection input to enable the first user to select one of the usernames associated with the video apparatus, including a username associated with a second user different from the first user, to be designated as an owner username of the recorded program, wherein the owner username is indicated to be responsible for requesting the recording of the selected program, and cause the On Screen Display unit to generate a signal representing a message indicating association of the owner username with the selected program in response to the selected program being accessed by a third user, and wherein the user input/output device is further configured to receive a user-entered message from the first user, associate the user-entered message with the selected program and the third user selected from one of the plurality of usernames, and cause the On Screen Display unit to generate a display including the user-entered message and the owner username indicated to be responsible for requesting the recording when the selected program is accessed by the third user.

16. The apparatus as in claim 15, wherein the user input/output device is configured to receive a targeted message and a designation of the third user, the designation signifying that the third user may view the targeted message, the On Screen Display generating the display including the user-entered targeted message when the selected program is accessed by the third user.

17. The apparatus as in claim 15, wherein the video signal source includes one or more of an over-the-air antenna, a satellite transceiver, a cable television cable, and a network connection.

18. The apparatus as in claim 15, wherein the access of the selected program by the third user comprises at least one of requesting playback of the selected program, requesting deletion of the selected program, requesting a listing of recorded programs including the selected program, requesting display of messages associated with the listing of recorded programs, and requesting recordation of the selected program subsequent to the first user requesting recordation of the selected program.

19. The apparatus as in claim 15, wherein the user input/output device is further configured to receive a user-entered message from the first user, associate the user-entered message with the selected program, and cause the user-entered message to be displayed when the selected program is accessed by the third user.

20. The apparatus as in claim 19, wherein the access of the selected program by the third user includes at least one of requesting playback of the selected program, requesting deletion of the selected program, requesting a listing of recorded programs including the selected program, and requesting display of messages associated with the listing of recorded programs.

21. The method as in claim 15, wherein the user input/output device is further configured to receive a second message from the third user when the selected program has been accessed by the third user, associate the second message with the selected program, and cause a second message indicating association of the selected program with the second message to be display when the selected program is accessed by the first user.

* * * * *